Jan. 22, 1957  A. H. HANSON  2,778,515
HAND TRUCK FOR TRANSPORTING AND SERVICING TELEVISION SETS
Filed Oct. 27, 1954  2 Sheets-Sheet 1

INVENTOR.
ALFRED H. HANSON
BY
Mock & Blum
ATTORNEYS

Jan. 22, 1957 A. H. HANSON 2,778,515
HAND TRUCK FOR TRANSPORTING AND SERVICING TELEVISION SETS
Filed Oct. 27, 1954 2 Sheets-Sheet 2
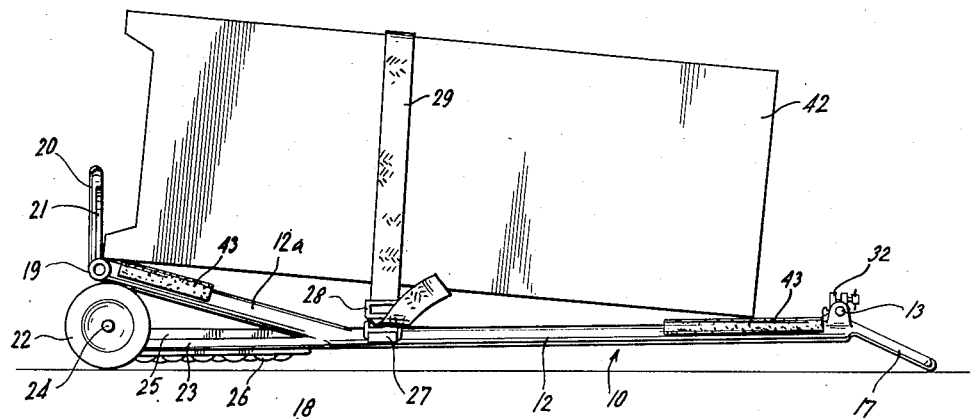
FIG. 5.
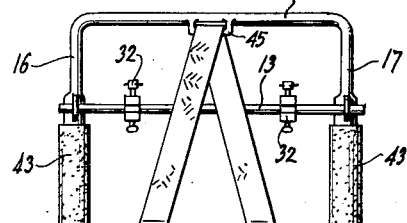
FIG. 7.
FIG. 6.
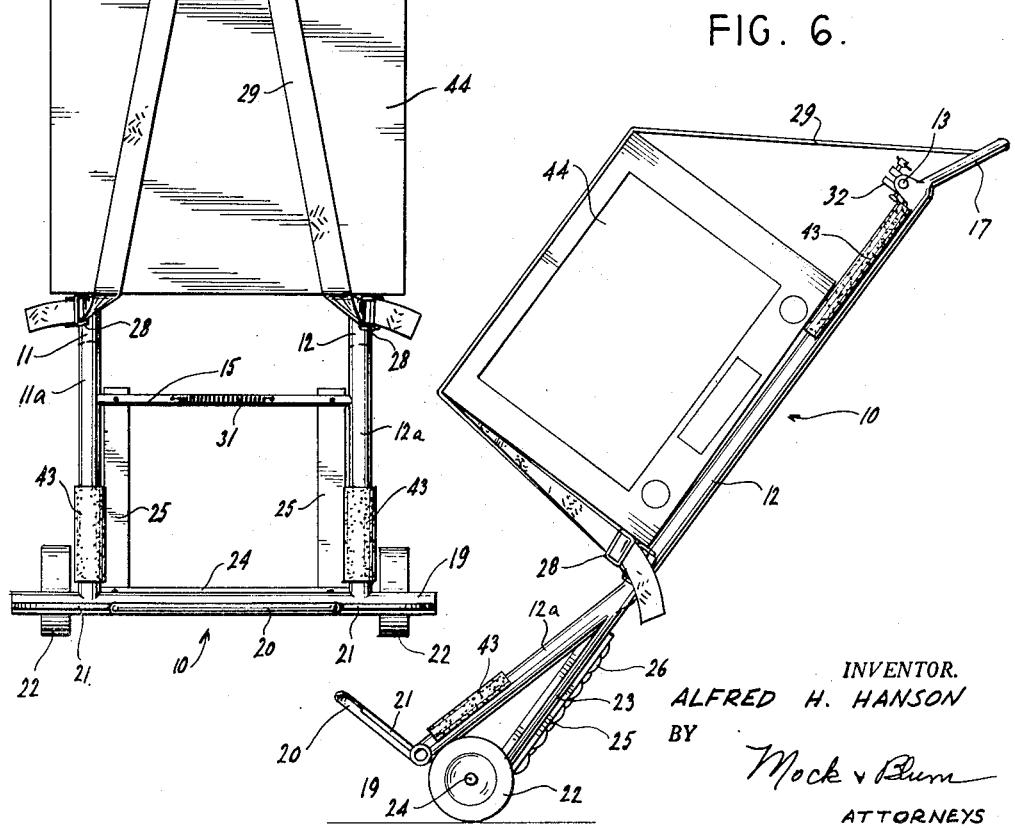
INVENTOR.
ALFRED H. HANSON
BY
Mock & Blum
ATTORNEYS United States Patent Office 2,778,515
Patented Jan. 22, 1957

2,778,515

HAND TRUCK FOR TRANSPORTING AND SERVICING TELEVISION SETS

Alfred H. Hanson, Garrison, N. Y., assignor to The Fairbanks Company, New York, N. Y., a corporation of New Jersey Application October 27, 1954, Serial No. 464,970

5 Claims. (Cl. 214—374)

This invention relates to improvements in hand trucks, and in particular to a new and improved appliance truck especially intended for transporting, servicing, and repairing television sets.

The invention contemplates the provision of an appliance truck of light weight and compact size which is particularly suited for use by television repair men, the truck being intended to be brought to the home of the customer and being suited to transport the set, if necessary, up or down flights of stairs and over other obstacles to the repair man's car or truck. In addition, the truck is also constructed to be used as a support on which the chassis of the set may be mounted with its interior circuit accessible for repair or servicing in the customer's home or in the repair man's shop. By such structure, the truck thus finds use as an all-purpose tool for the television repair man.

It is an object of the invention to provide a truck of the character described in which means are provided for the mounting of television sets upon the truck frame in such a manner that the chassis and picture tube thereof are located at the upper half of the truck where they are protected from damage due to vibration and shock of the truck wheels.

Another object of the invention is the provision of a hand truck of the character described in which the truck frame has a central open portion and clamp means are provided at the top of this open portion for clamping a television set chassis in registry with the open frame portion for convenient and accessible servicing of the television chassis.

Still another object of the invention is the provision of a hand truck of the character described in which the clamp means includes a plurality of clamps which pierce the metal of the chassis, to grip the chassis securely and rigidly.

Other objects and advantages of the invention will become apparent in the course of the following specification when taken in connection with the accompanying drawings, in which:

Fig. 5 is a side elevation of the hand truck shown in a horizontal position and carrying a console-type television set.

Fig. 6 is a side elevation showing the hand truck carrying a table model television set; and Fig. 7 is a front elevation of the hand truck and television set shown in Fig. 6.

Figure 1:
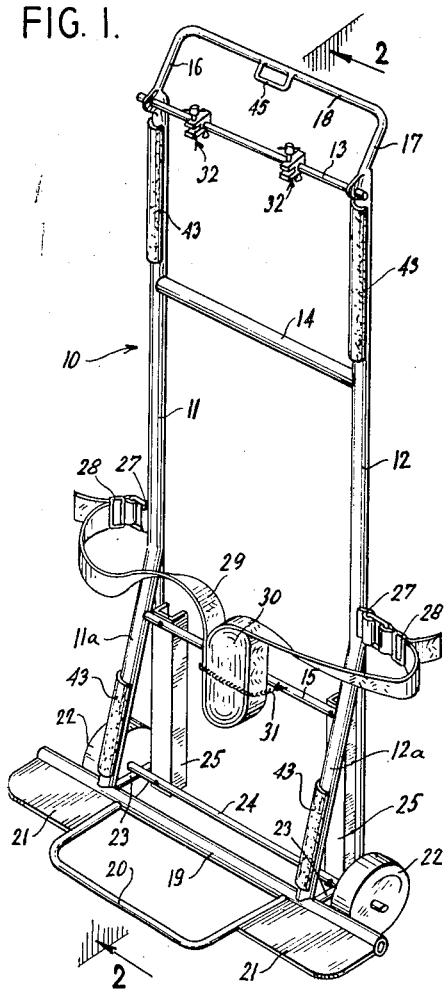
Fig. 1 is a front perspective view of the truck.

The hand truck comprises a frame 10 formed generally of hollow cylindrical metal rods or pipes, which are preferably made of light guage steel tubing to provide a lightweight truck. The frame includes a pair of side bars or stringers 11 and 12 joined by cross bars 13 and 14.

The stringers 11 and 12 are bent at their lower ends to form integral extensions 11a and 12a which extend angularly forward of said stringers, and are joined by cross bar 15. The top ends of stringers 11 and 12 terminate in a handle having side arms 16, 17 and a handle bar 18. As shown clearly in Fig. 2, the handle side arms 16, 17 are bent angularly and rearwardly relative to the plane of stringers 11 and 12, for a purpose which will be presently described.

Figure 2:
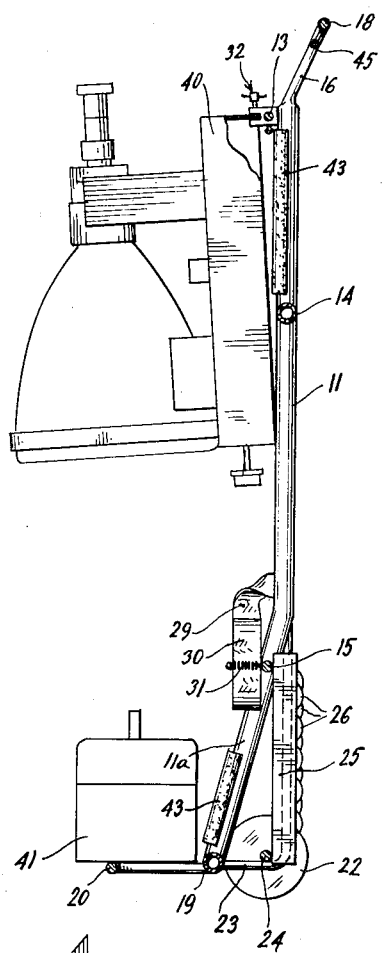
Fig. 2 is a vertical section substantially along plane 2—2 of Fig. 1, showing a television chassis mounted on the truck and a tool kit carried by the base.

The bottom ends of the stringer extensions 11a, 12a are connected to a cross bar 19 which is of greater length than the distance between extensions 11a, 12a and projects laterally at each end beyond said extensions. A nose piece 20 in the form of a U-shaped rod is secured to the front center of said cross bar 19, said nose piece 20 being flanked by sheet metal extension plates 21 which are connected to the ends of said cross bar 19. The nose piece 20 and its side extensions 21 are in the same plane, perpendicular to the stringers 11 and 12 as indicated in Figs. 1 and 2.

The truck has a rearwardly-extending frame extension which carries the wheels 22, the extension being formed by a pair of bars 23 extending transversely rearwardly from the bottoms of stringer extensions 11a and 12a. A cross rod 24 bridges and is secured to the respective bars 23. A pair of vertically-extending metal channels 25 are fixed at their top ends to the cross bar 15 and at their bottom ends to the cross rod 24 by welding, riveting or the like. The channels 25 are located on opposite sides of the truck frame and contain a series of staggered rollers 26 mounted for limited individual movement and arranged to enable the truck to ascend or descend a flight of stairs with a load mounted thereon. The structure of this stair-traversing arrangement will not be described herein since it is shown and described in detail in my co-pending U. S. patent application, Serial Number 361,485, filed June 15, 1954.

It will be observed that the rollers 26 as well as the truck wheels 22 are in substantial vertical alinement with the plane of the stringers 11, 12.

Each stringer 11 and 12 has a metal loop 27 secured thereto, the loops 27 carrying respective buckles 28. The ends of a belt or strap 29 are adjustably connected to said buckles 28. The center of belt 29 is adapted to be normally rolled into a spiral roll 30 which roll 30 is held in a pocket formed by a spring 31. The ends of spring 31 are secured to the center portion of the cross bar 15, and hold the roll 30 in a conveniently stored position so that the belt cannot interfere with the operation of the wheels or other parts of the hand truck when not in use.

The top cross bar 13 carries a plurality of clamp members 32 which are adapted to mount a television set chassis in position to be serviced on the hand truck. Clamps 32 which are shown in detail in Figs. 3 and 4 include a C-shaped body 33 having a through bore 34 at one end. The bore 34 is sized to receive the cross bar 13 for adjustable sliding movement of the clamp member 32 upon said cross bar 13, and a set screw 35 communicating with the bore 34 is provided to lock the clamp member 32 securely in its adjusted position. A clamping screw 36 is threadedly mounted in one of the arms of the C-shaped clamp body 33 in registry with a bore or recess 37 in the other arm of the clamp body. The clamping screw 36 has a finger bar 38 extending through the head thereof for turning said screw. The clamping screw 36 has a hardened pointed end or tip 39.

Figures 3, 4:
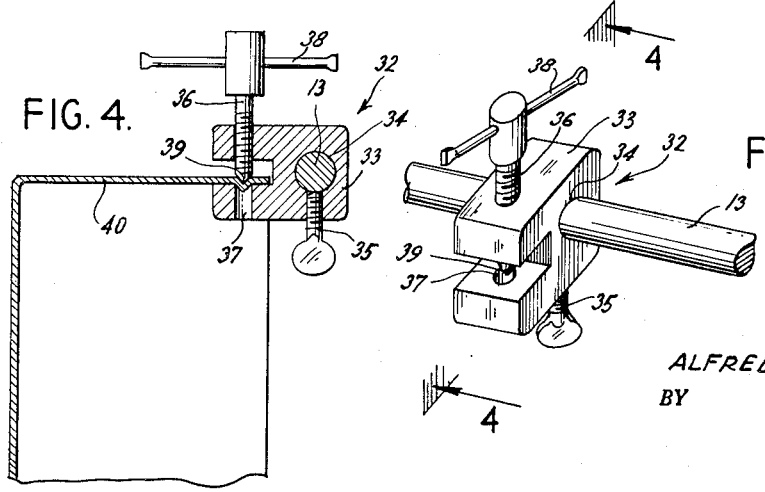
Fig. 3 is an enlarged perspective view of one of the clamp members for a television chassis, the support rod therefore being broken away.
Fig. 4 is a section taken substantially along plane 4—4 of Fig. 3, and showing a portion of a television chassis clamped by the member.

As shown in Figs. 2 and 4 a television set chassis 40 may be rigidly suspended upon the truck by inserting the edge portion of said chassis within the recess between the arms of the C-shaped clamp member 32 and the clamping screw 36, then screwed down into contact with the chassis wall. The pointed tip 39 of the clamping screw 36 is made of a hard metal so that as the screw 36 is turned down further, the point 39 presses a portion of the softer metal chassis wall into the recess 37 and indents the chassis wall within said recess. The chassis is thus rigidly and securely locked by the clamp member 32 and is restrained from any movement relative thereto. When a television service man is called to the home, he has the alternatives of repairing the set in the home or transferring the set to the repair shop for servicing and for subsequent delivery back to the home. In either case, the hand truck of the present invention will prove invaluable.

Servicing of television sets in the home has hitherto presented many problems in that the chassis must be removed from the cabinet and placed upon the floor or other surface for servicing. In either instance, the chassis presents a heavy bulky body having sharp projections which tend to scratch the surface upon which it is resting. In addition, when placed upon the floor, the service man crouches or sits with his test equipment in an uncomfortable and awkward position.

In use of the hand truck of the invention, the entire television chassis, when removed from the cabinet may be mounted on the truck frame by use of the clamping members 32 in the manner previously indicated. It will be noted that the stringers 11 and 12 are spaced sufficiently far apart so that the entire interior of the chassis, including the wiring of the electrical circuits, is visible and accessible from the rear of the truck. The chassis is mounted rigidly at the top of the truck on the clamp members 32 and its bottom edge may rest upon the stringers 11 and 12 as indicated in Fig. 2. The service man may now sit comfortably in a chair and work on the totally exposed chassis, the work now being at eye level with consequent good lighting and maximum convenience. A lamp and various test equipment such as meters and the like, may be conveniently hung from the handle 19.

If it is necessary to remove the chassis from the home and transfer it to the service shop for repair, the chassis may be removed from the cabinet and hung in the same manner, it then being rigidly and movably mounted at the top of the truck in a position in which its delicate parts and tubes are remote from the shock and vibration imparted to the truck frame by the wheels 22 and rollers 26. In such use of the truck, the repair man need only make one trip from the customer's home, his tool box 41 and other equipment being placed upon the nose piece 20 or extensions 21 for transferring simultaneously with the chassis.

If it is necessary to transfer an entire television set including the cabinet into or out of the home of the customer, the belt 29 is utilized. Fig. 5 shows a console model television set 42 strapped to the chassis by belt 29. The console set 42 is mounted in a tilted position relative to stringers 11 and 12, the top edge of the cabinet resting upon the upper portion of the stringers 11 and 12 while the lower end of the cabinet abuts the stringer extensions 11a, 12a. In this mounted position, the belt 29 is drawn around the center of the cabinet 42 and is tightened by drawing its ends through buckles 28 which are provided with teeth to grip the belt in tightened position. Cushion strips 43 made of rubber, felt or other suitable material, may be secured to the stringers and stringer extensions as shown in Fig. 5 for protecting the wooden finish of the cabinet in such mounted position.

Figs. 6 and 7 show the manner in which belt 29 may be used as a sling to mount a table model television set 44 on the truck frame. For this purpose a metal loop 45 is provided at the center of the handle bar 18. The belt 29 is passed through the loop 45, the opposite belt sections being drawn across the top of the cabinet. The ends of the belt are then drawn tight through the buckles 28 so that the cabinet is strapped securely against the truck frame.

It will be observed that in mounting of either of the two types of cabinets, the television chassis in the cabinet is secured to the top of the truck frame, thereby minimizing shock to the vacuum tubes and other critical electronic parts. This is particularly desirable when the rollers 26 are used for traversing a flight of stairs, since the shock of the truck striking each stair tread is considerable when a heavy load is mounted thereon.

The annular disposition of stringer extensions 11a and 12a provides a forwardly off-set frame portion which gives clearance for the control knobs when a console model is mounted on the truck. This also enables the console model to be mounted with its front facing the truck and eliminates the necessity for sliding or pushing the cabinet over the floor in order to turn it for mounting. In addition, the tilted position of mounting a console model afforded by the stringer extensions 11a and 12a, provides a better load balance than would be possible if the cabinet were mounted in a vertical position. The weight of the chassis which is invariably located at the top of console sets is thus distributed in a maximum rearward position in relation to the truck wheels, which gives the hand truck operator a better control in moving the hand truck by minimizing the horizontal pull on the operator.

The rearwardly inclined side arms 17 and 18 of the handle 19 provides an off-set handle construction which may serve as a skid for sliding the load in or out of a delivery or service truck. The off-set handle 19 permits the operator to rest the unit with its mounted load against the service truck floor or tail gate. Preparatory to placing the load in the truck the bottom of the hand truck is then lifted until the stringers 11 and 12 are in the horizontal position shown in Fig. 5 and the load is pushed forwardly, the tubular handle 18 sliding easily over any truck floor. The open frame of the tubular nose piece 20 provides a handle which may be gripped by the operator for lifting the truck frame when the truck is used in such skid application or for lifting the truck over high obstacles, etc. On the other hand, the extension plates 21 serve in conjunction with the nose piece 20 to provide a wide support surface for the mounting of wide console models and the like.

While a preferred embodiment of the invention has been shown and described herein, it is obvious that numerous changes, omissions and additions may be made in the invention without departing from the scope or spirit thereof.

What is claimed is:

1. A hand truck for transporting and servicing television sets, said hand truck comprising an open wheeled frame including a pair of side bars and a cross bar connecting the upper ends of said side bars, said frame having a longitudinally-extending upper portion and a forwardly-inclined lower portion, a pair of buckles respectively mounted on said side bars at the junction of said upper and lower frame portions, a belt for mounting television cabinets on said trucks, said belt being releasably and adjustably held at its end portions by said buckles, a loop centrally mounted on the upper end of said frame and sized to hold a central portion of said belt for clamping a television cabinet between said belt and the upper portion of said frame, and means mounted on said cross bar for suspending a television chassis against the upper portion of said frame.

2. A hand truck for transporting and servicing television sets, said hand truck comprising an open frame mounted on wheels, said frame comprising a pair of side bars, a cross bar connecting the upper ends of said side bars, a handle member extending across the top of said frame, and a nose piece secured to the bottom of said frame, said side bars having longitudinally-extending upper portions and forwardly-inclined lower portions, a plurality of C-clamps mounted on said cross bar and adapted to receive and hold an edge portion of a television chassis for suspending said chassis against the upper portion of said side bars, a pair of buckles respectively mounted on said side bars at the junction of said upper and lower portions, a belt for mounting television cabinets on said truck frame, said belt being releasably and adjustably held at its end portions by said buckles.

3. A hand truck according to claim 2 in which said nose piece is wider than said frame for supporting a console-type television cabinet in mounted position on said frame, the inclined lower side bar portions maintaining said mounted cabinet in a tilted position on said frame, said belt being located to extend around the central portion of said cabinet.

4. A hand truck according to claim 2 in which said belt is also adapted to mount a table-model television cabinet at the upper portion of said frame, said handle having a loop secured at the center thereof sized to receive the central portion of said belt, whereby said belt forms a sling extending around said cabinet and clamping said cabinet against the upper portion of said side bars.

5. A hand truck according to claim 2 in which said handle member is rearwardly inclined and is of sufficient size to act as a skid to support the hand truck in a horizontal position upon a support surface with the opposite end of the frame supported by said wheels, said nose piece having an open-frame central portion and acting as a handle for pulling the horizontally-disposed truck on said skid.

References Cited in the file of this patent

UNITED STATES PATENTS

| | | |
|---|---|---|
| 527,815 | Schnell | Oct. 23, 1894 |
| 1,465,945 | Lea | Aug. 28, 1923 |
| 1,873,690 | Ward | Aug. 23, 1932 |
| 2,165,603 | Yeats | July 11, 1939 |
| 2,623,760 | Fornelius | Dec. 30, 1952 |
| 2,670,093 | Reppert | Feb. 23, 1954 |
| 2,711,872 | Lampke | June 28, 1955 |

FOREIGN PATENTS

| | | |
|---|---|---|
| 699,025 | Great Britain | Oct. 28, 1953 |